United States Patent [19]
Schwenk

[11] 3,889,774
[45] June 17, 1975

[54] ACCIDENT RESPONSIVE AUTOMATIC IGNITION CUT-OFF SWITCH

[76] Inventor: George B. Schwenk, 7711 Deer Trail, Yucca Valley, Calif. 92284

[22] Filed: June 24, 1974

[21] Appl. No.: 481,998

[52] U.S. Cl. ........ 180/104; 200/61.52; 200/DIG. 29
[51] Int. Cl. .................... B60r 21/00; H01h 35/02
[58] Field of Search ............... 180/104, 103, 82 C; 200/52 A, 61.44, .45 R, .48, .51, .52

[56] References Cited
UNITED STATES PATENTS

| 1,915,267 | 6/1933 | Bigelow | 200/61.52 A |
| 2,174,846 | 10/1939 | Soulat | 180/104 |

FOREIGN PATENTS OR APPLICATIONS

| 729,387 | 6/1932 | France | 180/104 |
| 722,225 | 8/1952 | United Kingdom | 200/61.52 |

Primary Examiner—Kenneth H. Betts
Assistant Examiner—Jack D. Rubens
Attorney, Agent, or Firm—Dana E. Keech

[57] ABSTRACT

A normally open safety switch connecting the negative side of the ignition coil of an automotive vehicle to ground, said switch being fixed on the fire wall thereof so as to remain open with the vehicle in any normal operating position but including a metal ball which is gravity actuated by the vehicle being canted in any direction as much as 50° from its normal upright position, to close said switch and ground said coil, thus instantly shutting off said engine.

1 Claim, 4 Drawing Figures

PATENTED JUN 17 1975 3,889,774

ACCIDENT RESPONSIVE AUTOMATIC IGNITION CUT-OFF SWITCH

SUMMARY OF THE INVENTION

One of the unsolved hazards of automobile accidents is the igniting of spilled fuel by the motor continuing to run following the crash. Many victims not fatally injured by the crash are thus often burned to death.

It is an object of the present invention to greatly reduce this hazard by providing a normally open switch which functions automatically when the vehicle equipped therewith is canted at an angle as much as 50° in any direction from its normal upright position, so as to instantly shut off the engine of the vehicle.

Another object of the invention is to provide such a safety switch which remains closed as foresaid until the vehicle is returned to a position in which it is canted from its normal upright position at an angle of substantially less than 45°.

A further object is to provide such a switch which is inertia actuated to shut off the engine in automatic response to the vehicle being buffeted by a horizontal impact in a collision.

DETAILED DESCRIPTION OF THE PREFERRED EMBODIMENT

Figure 1:
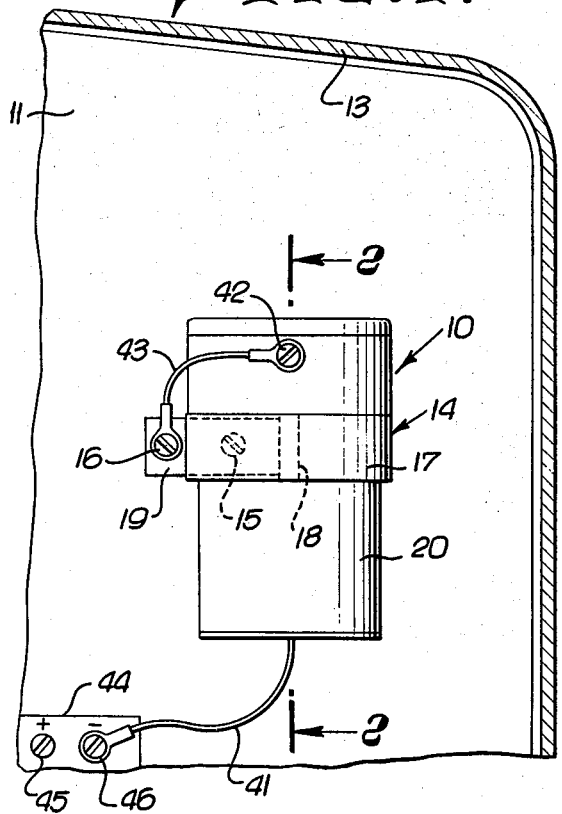
FIG. 1 is a diagrammatic sectional view through the hood of an automobile and illustrating a portion of the fire wall of the latter on which is vertically mounted a preferred embodiment of the invention.
Figure 2:
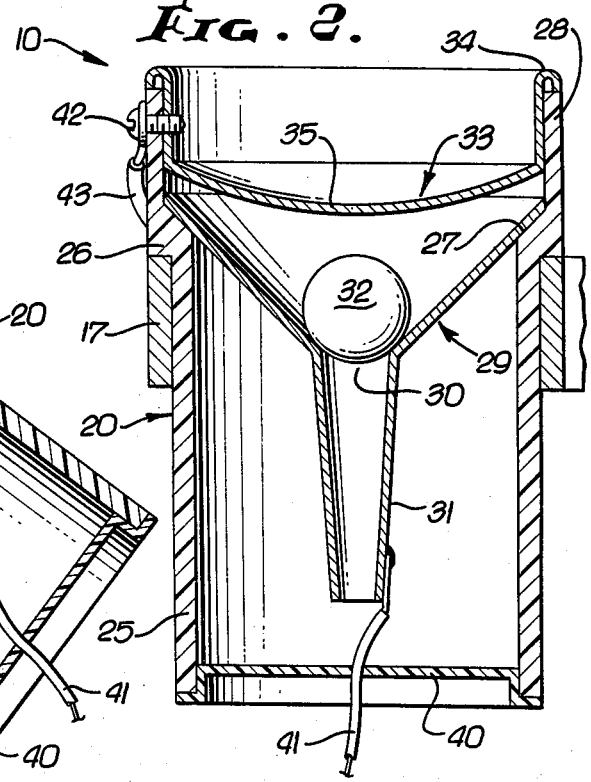
FIG. 2 is an enlarged vertical sectional view taken on the line 2—2 of FIG. 1 and illustrating the internal construction of said switch.

Referring specifically to FIGS. 1 and 2, a preferred embodiment 10 of the switch of the invention is illustrated in these views in vertically upright position with said switch mounted on the metal fire wall 11 of a motor vehicle 12 and with the switch enclosed by the hood 13 of said vehicle. As clearly shown in FIG. 1, the switch 10 is in vertical upright position when the vehicle 12 is in a similar position, the switch 10 being rigidly mounted on the fire wall 11 by a bracket 14 and two screws 15 and 16 which penetrate said bracket and screw into suitable holes provided in said fire wall. The bracket 14 includes a ring 17 having formed integrally therewith a radial extension 18, the outer end portion of which is bent to form a foot 19 which rests flat against the fire wall 11 and has apertures for receiving the screws 15 and 16. When the bracket 14 is mounted on the fire wall 11, the ring 17 thereof lies in a horizontal plane with the axis thereof disposed vertically.

The switch 10 includes a housing 20 made of dielectric or insulating material, the lower portion 25 of which is cylindrical and fits snugly in the ring 17 and may be cemented therein if desired. Formed outwardly from the upper end of the lower portion 25 of housing 20 is an annular shoulder 26 which sits on top of ring 17 and has the same outside diameter as said ring. The shoulder 26 has a beveled upper face 27 and terminates upwardly in an upper housing portion 28 which has the same outer diameter as said shoulder and a somewhat thinner wall than the lower portion 25 of said housing.

Fitting downwardly within upper housing portion 28 and resting on shoulder 26 is a lower metallic switch contact member 29 which is in the form of a cone having an opening 30 at its apex which connects with a tapered downwardly extending tube 31. The aperture 30 preferably has a diameter of about seven-sixteenth inch and a metallic ball 32 which is preferably about eleven-sixteenth inch in diameter is supported by member 29 and which normally is held in axial alignment with said member by gravity.

Figure 3:
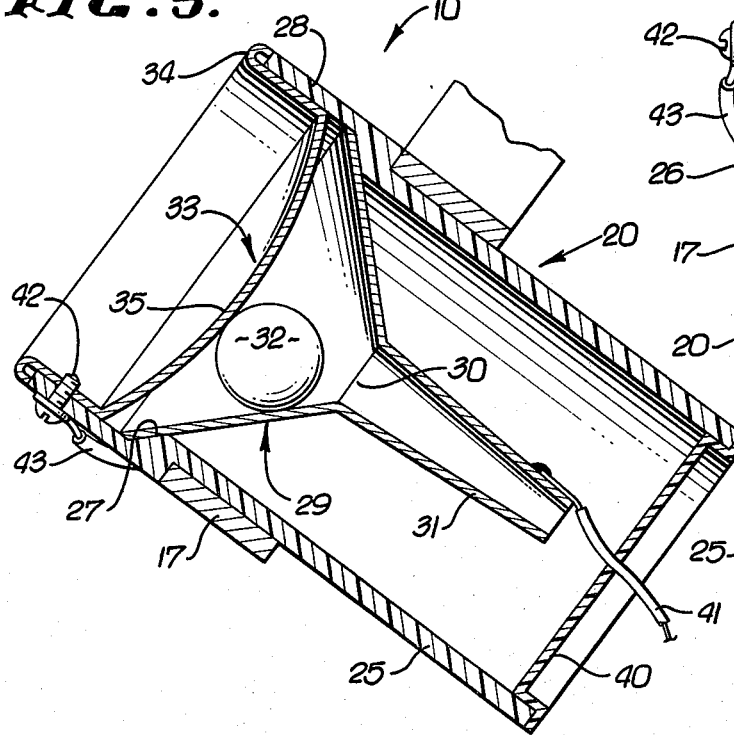
FIG. 3 is a view similar to FIG. 2 and illustrating the condition inside said switch which occurs when said vehicle is canted at an angle of approximately 50° in any direction from its normal upright position.

Pressed into the upper portion 28 of the housing 20 of the switch 10 is an upper metallic contact member 33 which has an upper annular bead 34 which rests on top of the upper housing portion 28, said member also having a downwardly bulging bottom plate 35 which at its center is faced about one-fourth inch upwardly out of contact with the ball 32, while peripheral portions of bottom plate 35 converge towards peripheral portions of the lower contact member 29 so that whenever the switch 10 is tilted or canted as much as 50° from its upright position as shown in FIG. 3, the ball 32 will gravitate from its centralized position in lower contact member 29 so as to simultaneously be in contact with said lower contact member and with said upper contact member 33.

Figure 4:
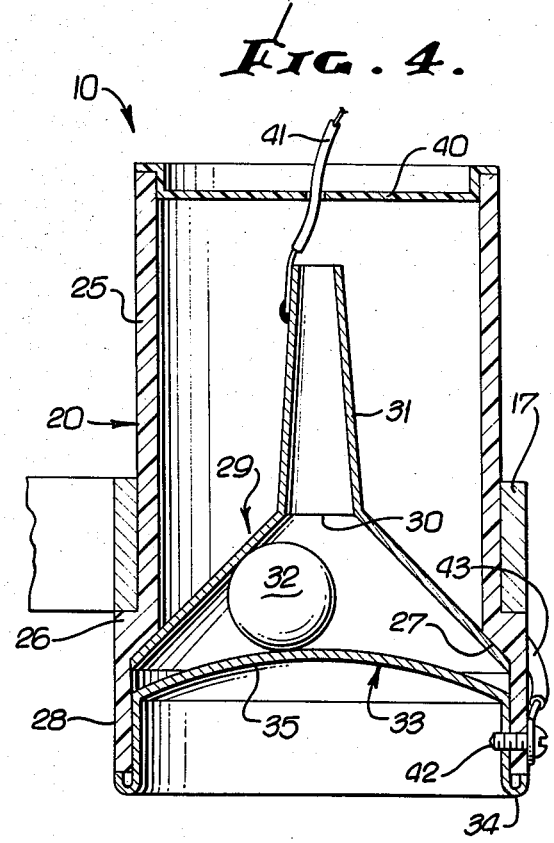
FIG. 4 is a view similar to FIG. 3 but illustrating the invention as when the vehicle on which the same is mounted is turned exactly upside down.

FIG. 4 shows the switch 10 in completely inverted position, that is, upside down, which illustrates the fact that ball 32 remains simultaneously in contact with both the lower contact member 29 and upper contact member 33 regardless of the position the switch may be in so long as it is canted from upright position at an angle in excess of 45°.

Members 29 and 33 may be permanently assembled in housing 20 as by cementing the same in place as shown.

The lower end of housing 20 is closed by a plastic cap 40 having a central aperture through which a terminal wire 41 extends, said wire being secured as by soldering to the lower end of tube 31 of the lower contact member 29. Connected with the upper contact member 29 by a screw 42 which extends through a suitable aperture formed in the upper housing portion 28 and in the upper contact member 33 is an upper terminal wire 43. The ignition system of the motor vehicle 12 is provided with a coil 44 having positive and negative terminal screws 45 and 46. The lower terminal wire 41 of the switch is connected to the negative terminal screw 46 of the ignition coil 44. The upper terminal wire 43 is grounded to the frame of the motor vehicle 12 by connecting the free end of this wire with screw 16 which penetrates the fire wall 11.

OPERATION

The switch 10 is so designed that in the absence of an accident taking place which endangers the overturning of the vehicle or actually overturns the same, the switch 10 remains open with the ball 32 thereof resting in the aperture 30 at the center of the lower contact member 29. The switch is designed however, so that when the vehicle 12 is canted from its normal upright position to an angle as great as 50° in any direction, this will cause the switch 10 to close by gravity and the instant this switch closes, the ignition coil 44 is thus grounded and the vehicle engine shut off. Thus, any spillage of motor fuel which was incurred as a result of the accident cannot be ignited as is frequently otherwise the case by the engine continuing to run after the accident has occurred.

The switch 10 also shuts the engine off when the vehicle 12 is subjected to a violet shock in a horizontal plane, such as by a head-on collision. This is due to the relatively high inertia of the metal ball 32 which tends to continue in the direction it was traveling when the vehicle 12 is brought to a sudden stop. This tendency of the ball 32 closes the switch 10 and turns off the vehicle engine.

FIG. 4 illustrates how the switch 10 automatically remains closed when the vehicle 12 is rotated by an accident to a position in which it is approximately upside down or in fact, canted to any angle in excess of 45° from upright position.

The claim is:

1. A safety electric switch for shutting off the engine of an automotive vehicle in the event said vehicle is canted in any direction more than a specific maximum angle from its normal upright position, said switch comprising:

a cylindrical dielectric switch housing having a vertical bore, an upper end portion of which housing is enlarged in both its outside and inside diameters to provide an internal counter bore terminating at its lower end in an inwardly bevelled annular shoulder facing upwardly and providing an outside downwardly facing annular shoulder;

a lowr steeply conically concave metalic switch contact member the peripheral portion of which rests on and is cemented to said inwardly bevelled annular shoulder;

an upper shallowly concave metallic switch contact member, comprising the bottom of a cylindrical wall which snugly fits downwardly into said counter bore and has an external annular flange overlying and engaging the top end of said switch housing, said members being thus co-axially related with each other and with said bore; and a metal ball resting normally upon and in centered relation with said lower contact member and out of contact with said second contact member, said ball automatically rolling out of its centered relation with said lower contact member and into contact with said upper contact member when said switch is canted from its normal upright position in any direction more than said specific maximum angle;

bracket means for mounting said switch up rightly upon said vehicle with the axis of said bore vertical when said vehicle is in normal upright position said means including a ring fitting the lower portion of said housing and flush with said outside annular shoulder of said housing whereby said switch is supported by said ring; and means for interposing said switch in the igniton circuit of said engine so as to shut off said engine when said switch is closed by said ball simultaneously engaging both of said contact members.

* * * * *